July 3, 1962  R. D. KERN  3,042,850
ELECTRICAL FIELD EXCITATION CIRCUITS FOR ALTERNATORS
Filed Aug. 3, 1959  2 Sheets-Sheet 1

INVENTOR.
Robert D. Kern,
BY Morsell & Morsell
ATTORNEYS.

July 3, 1962  R. D. KERN  3,042,850
ELECTRICAL FIELD EXCITATION CIRCUITS FOR ALTERNATORS
Filed Aug. 3, 1959  2 Sheets-Sheet 2

INVENTOR.
Robert D. Kern,
BY Morsell & Morsell
ATTORNEYS.

United States Patent Office 3,042,850
Patented July 3, 1962

3,042,850
ELECTRICAL FIELD EXCITATION CIRCUITS FOR ALTERNATORS
Robert D. Kern, Waukesha, Wis., assignor to Gener AC Corp., Wales, Wis., a corporation of Wisconsin
Filed Aug. 3, 1959, Ser. No. 831,242
5 Claims. (Cl. 322—27)

This invention relates to improvements in electrical field excitation circuits for alternators.

There are many practical embodiments of alternators or generators which are used in various assemblages for supplying A.C. current to a piece of electrical equipment. For instance, in motor truck refrigeration it is necessary to provide an electrical circuit which will maintain a fixed voltage over frequency ratio over the operating speed range of the vehicle. The compressor loads that are driven by the alternators will draw a constant motor current as long as this fixed voltage over frequency ratio is maintained.

It is, therefore, a general object of the present invention to provide in an electrical circuit for the purposes described, an alternator with a field excitation circuit which will satisfy the requirements.

Various types of A.C. equipment, such as A.C. induction type motors, draw an exceedingly large motor current during the starting condition, which motor current will quite often be several times the normal running current of the motor or equipment. In the present invention, to provide for this overload capacity from a standard magnetically saturated alternator, it is necessary to increase the field ampere turns in proportion to the increase in motor starting current. In connection with the A.C. equipment starting requirements and a magnetically saturated alternator wherein the field ampere turns are increased in proportion to the increase in the equipment starting current, it is proposed to utilize a series type bridge rectifier which will provide an increase in the field current as the electrical load draws the increased current for starting purposes. The magnetically saturated circuit of the alternator and the fixed source of D.C. field voltage will provide a fixed V./F. ratio with changing frequencies. A series connected bridge rectifier circuit, however, biases the field current in proportion to changing load conditions, thereby accomplishing the fixed V./F. ratio with changing loads.

A more specific object of the present invention is to provide an electrical circuit for an alternator for supplying A.C. current to equipment wherein there is a large increase in the overload capacity of the alternator although the latter can be of a minimum size and weight.

A further specific object of the invention is to provide an electrical circuit for an alternator wherein the circuit is devoid of electrical contacts, relays and coils which enhances its reliability and which additionally provides for a circuit requiring no adjustment for proper operation thereof.

A further specific object of the invention is to provide an electrical circuit for an alternator of the character described which may include a fuse to provide overload protection and to automatically disconnect and shut off the alternator, said circuit being extremely simple and inexpensive to install.

A further specific object of the invention is to provide an electrical circuit for an alternator which when used in connection with motor truck carried equipment will relieve the load burden on the truck electrical system and which is simple to service and maintain.

A further object of the invention is to provide an electrical circuit for an alternator wherein the field excitation for the alternator is supplied in the form of two electrical components, one being of fixed value derived from the fixed D.C. voltage source in the system, and the second being a variable D.C. field current proportional to the output A.C. current from the alternator, derived from a sries connected rectifier in an A.C. output line.

A further object of the invention is to provide an electrical circuit for an alternator wherein a bridge type rectifier is connected in series with an A.C. output load and is furthermore connected in parallel with a fixed D.C. current source and the alternator field.

A further object of the invention is to provide an electrical circuit for an alternator which is simple, practical, and which is well adapted for the purposes set forth.

With the above and other objects in view the invention consists of the electrical field excitation circuit for an alternator, and its parts and combinations as set forth in the claims, and all equivalents thereof.

In the accompanying drawings in which the same reference characters represent the same parts in all of the views.

Figure 2:
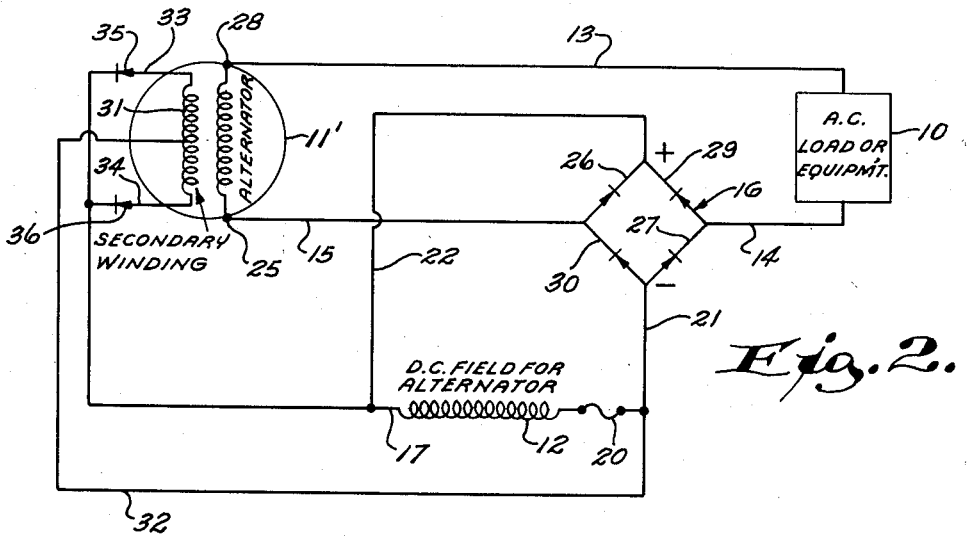
FIG. 2 is a diagrammatic view of a modified form of circuit wherein there is a constant frequency alternator provided with an auxiliary A.C. center tap winding to supply direct fixed voltage rectified by a center tap rectifier to the alternator field.
Figure 3:
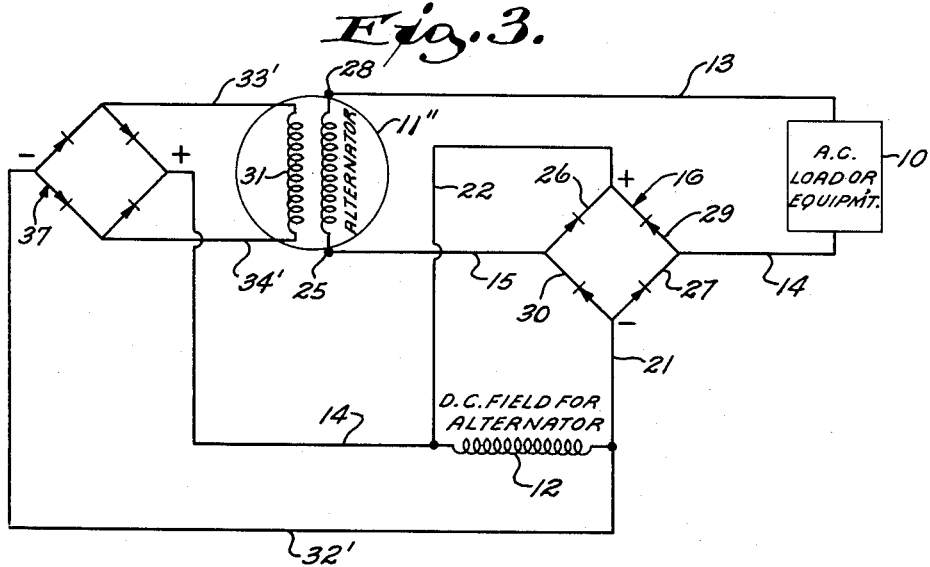
Figure 4:
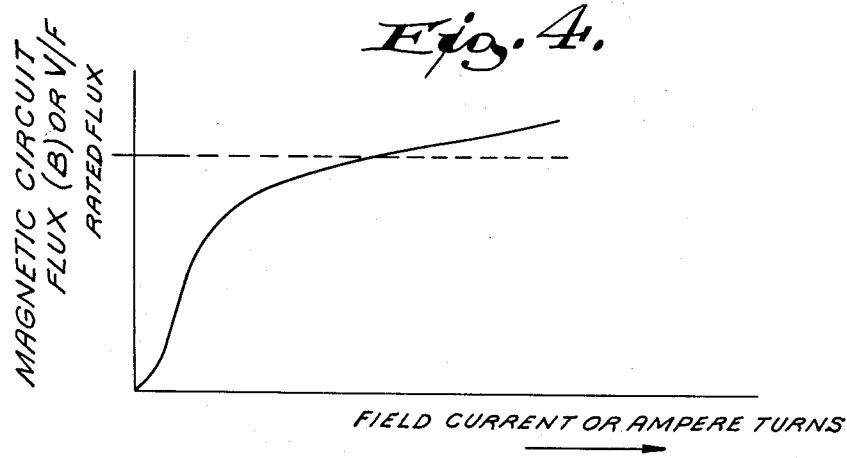

FIG. 3 is a diagrammatic view of a further modified form of alternator field excitation circuit, similar to the arrangement shown in FIG. 2, only including a bridge rectifier circuit which provides fixed D.C. voltage to the alternator field; and FIG. 4 is a graph or chart illustrating A.C. output voltage, the field current or field ampere turns and the rated flux characteristics of the system resulting from the operation of the magnetic structure of the alternator in the saturated region.

Figure 1:
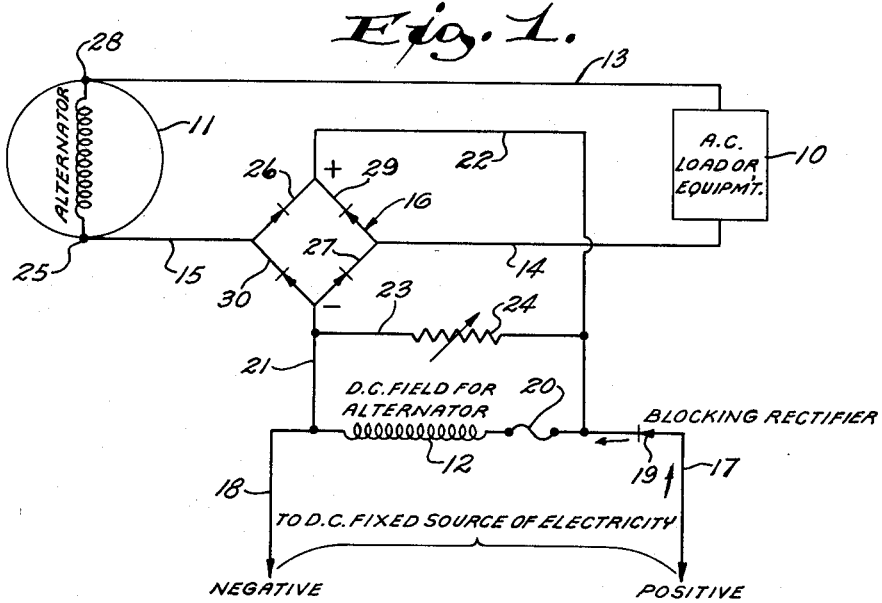
FIG. 1 is a wiring diagram of the components of the preferred form of the circuit wherein one of the components for the field excitation for the alternator is derived from a fixed D.C. voltage source in the system.

Referring now more particularly to the form of circuit shown in FIG. 1 it will appear that the load or electrical equipment to be operated by A.C. current is indicated generally by the numeral 10. The numeral 11 designates an alternator which by way of example is shown as being a single phase alternator, but, within the purport of the present invention, the alternator could be a two phase or a three phase alternator, or, a single phase, single voltage or a single phase, dual voltage alternator. The numeral 12 designates the D.C. field for the alternator. The alternator, as will be noted, includes generating windings as well as the excitation windings and the generating windings must be such as to cause the flux density of the magnetic structure to operate within the saturation region at the rated output voltage, as is shown in the chart of FIG. 4. Output lines 13 and 14 are connected to the load or equipment 10 with the output line 13, for instance, being connected directly to the generating winding of the alternator 11. The other terminal of the alternator generating winding has connected thereto a circuit wire 15 and electrically interposed between the circuit wire 15 and the output line 14 is a bridge type rectifier designated generally by the numeral 16. It will thus be seen that the alternator 11 and the bridge type rectifier 16 are in series with the A.C. load or equipment 10.

A circuit wire 17 is connected to the D.C. fixed source of voltage, which in the case of a refrigerated motor truck could be the truck battery or D.C. generator, and another circuit wire 18 is grounded or otherwise connected to the D.C. fixed source of electricity. Electricity from the D.C. fixed source flows through the circuit wire 17 in the direction indicated by the arrow in FIG. 1 and is prevented from reverse flow by a blocking rectifier 19. There is also interposed in the circuit wire 17 a fuse 20. Because of the high overload capacity obtainable in respect to the circuit illustrated, the alternator 11 could be substantially damaged if permitted to operate under short-circuit conditions for a substantial period of time. Consequently, the fuse 20 which is in circuit with the D.C. field 12 for the alternator and in series with the bridge type rectifier 16, will blow should an extreme overload condition occur, and thereby open the circuit to the field 12. Under these conditions the magnetic field will collapse and the output voltage of the alternator will drop to zero, thereby unloading the system. Connected to the circuit wire 17 beyond the alternator field windings 12 and connected to the negative terminal of the rectifier is a circuit wire 21. Another circuit wire 22 is connected to the positive terminal of the rectifier 16 and is furthermore connected to the circuit wire 17 forwardly of the alternator field winding 12. Hence the bridge type rectifier 16, which is in series with the A.C. load or equipment 10, is in parallel with the fixed D.C. source of electricity and is furthermore in parallel with the alternator D.C. field winding 12.

A shunt wire 23, extended between the circuit wires 21 and 22, has included therein a "thyrite" device 24 which operates to limit the maximum voltage which can occur across the bridge rectifier 16 to protect against failure due to high surge voltages.

The base component of the circuit, which is fixed value voltage from the D.C. fixed source, serves to supply excitation for the alternator D.C. field windings 12 which create the output voltage of the alternator. As will be obvious, the current flow is from the D.C. source or battery through the circuit wire 17 and through the alternator field windings 12 and back to the source or battery through the circuit wire 18 which may be grounded.

The current for the second component, when the equipment or A.C. load 10 is connected, commences at the highest voltage point in the circuit which could be the alternator terminal 25 and then flows through the circuit wire 15 into the rectifier 16 and through the arm 26 thereof to the positive terminal of the rectifier from whence the current will flow through circuit wire 22 to the circuit wire 17 through the field 12 and back to the negative terminal of the rectifier 16 via the circuit wire 21. The current in thus flowing to the low potential point in the circuit will pass through arm 27 of the rectifier and then through the output line 14 to the load or equipment 10. The circuit is then completed through the output line 13 to the terminal 28 of the alternator 11.

On the negative half of the alternator output cycle the terminal 28 of the alternator becomes the positive terminal causing a reversal of the direction of the current flow through the connected A.C. load or equipment 10. During this portion of the cycle the current returns from the load or equipment 10 through the output line 14 to the rectifier 16 where it flows through the rectifier arm 29 to the circuit wire 22, through the field 12 and back to the rectifier through the connection 21 from whence it flows through the rectifier arm 30, returning to the alternator terminal 25.

An alternative form of electrical circuit for an alternator is diagrammatically illustrated in FIG. 2. In this form of circuit the D.C. fixed source of voltage for the excitation of the D.C. field winding 12 for the alternator is eliminated. In lieu thereof an alternator 11' is provided which has a secondary winding 31. The terminal 28 of the primary winding of the alternator 11' is connected by a circuit wire 13 with a terminal of the A.C. load or equipment 10. The terminal 25 of said primary winding of the alternator 11' is connected by wire 15 with a terminal of the bridge type rectifier 16, another terminal of the bridge type rectifier being connected by circuit wire 14 with the other terminal of the load or equipment 10. The secondary winding 31 of the alternator 11' provides the D.C. current for exciting the D.C. field winding 12 of the alternator. The fixed voltage is supplied from a center tap on said secondary winding 31 of the alternator 11' by a circuit wire 32 which connects with the circuit wire 21 leading to the negative terminal of the bridge type rectifier 16 and with a circuit wire 17 in which the D.C. field winding 12 for the alternator is interposed. The circuit wire 17 also connects with circuit wires 33 and 34 which provide a center tap rectifier circuit and in which are blocking rectifiers 35 and 36 respectively. Consequently, the fixed voltage is supplied by the secondary winding 31 of the alternator 11' and is rectified to supply direct fixed voltage to the alternator field windings 12. The operation of the circuit illustrated in FIG. 2 and the functioning of the bridge type rectifier 16 is similar to that described in connection with the circuit shown in FIG. 1. This circuit is for constant frequency applications.

A second alternative form of a circuit for a self-excited alternator 11'' which is also for constant frequency applications is shown in FIG. 3. This is similar to the circuit shown in FIG. 2 except that in lieu of the rectifier circuit 33—34 and the blocking rectifiers 35—36 therein, the terminals of the secondary winding 31 of the alternator 11'' are connected through circuit wires 33' and 34' with a pair of opposed terminals of a bridge type rectifier 37. Another terminal of the bridge type rectifier 37 has extended therefrom a circuit wire 32' which connects with the wire 21 leading to the negative terminal of the main bridge type rectifier 16 and with the field winding circuit wire 14 which also connects with still another terminal of the bridge type rectifier 37. It will thus be understood that the bridge type rectifier 16 is in series with the A.C. load or equipment 10 and is in parallel with the D.C. field 12 for the alternator.

The field winding for the alternators of FIGS. 2 and 3 may, if desired, comprise two coils instead of the single coil illustrated. This would electrically separate the two rectifier circuits, permitting the operation of the series connected rectifier 16 at low voltage and high current. The fields of the shunt connected rectifier circuits 35 and 36 of FIG. 2 and 37 of FIG. 3 may thus be operated at a substantially higher voltage, thereby increasing reliability of voltage build-up when bringing the alternator up to speed.

The chart shown in FIG. 4 illustrates the operation of the magnetic structure of the alternators of the several alternative circuits illustrated in relation to the field current or ampere turns, and the rated flux. For any magnetic circuit such as that included in the alternators of the present invention the flux indicated by the vertical line in the chart is equal to a constant times voltage divided by frequency. As shown in the chart the rated flux or voltage frequency ratio provided by the circuit of the instant invention is shown by the horizontal broken line. Because of the high degree of saturation involved, the alternator can tolerate a relatively wide field current or field ampere turn variation without undue influence on the voltage frequency ratio output of the apparatus.

While the improved circuit, and its components, of the present invention find particular utility in connection with the operation of electrical equipment such as refrigeration, electric hoists, etc. embodied in a motor truck or the like or in connection with motor operated mobile marine equipment, farm equipment, etc., it should be understood that the improved electrical circuit for an alternator is more generally applicable. In the improved circuit the positive and negative terminals of the bridge rectifier are connected directly to the alternator field. Consequently, the field current supplied by the rectifier will be in direct proportion to that drawn by the motor load. The load, if it be in the nature of an A.C. induction type motor, will draw an exceedingly large motor current during the starting operation, which will be several times the normal running current of the motor. The alternator used in the present circuit handles this overload capacity because the field ampere turns therein are increased in proportion to the increase in the motor starting current. The bridge type rectifier, connected in series, will provide an increase in the field current as the motor draws the increased current for motor starting but, the V./F. ratio will not change appreciably during the starting conditions because this additional field current maintains a fixed magnetically saturated circuit for the alternator. The requirements for proper operation of the A.C. load or equipment are maintained over wide ranges of speeds and loads because of the fixed V./F. ratio maintained by the magnetic circuit.

In addition to the above the circuit of the present invention is extremely simple, reliable, easy to install and service because it is devoid of electrical contacts, relays and coils. The alternator excitation circuit, besides being completely practical for its intended purposes and inexpensive, is well adapted for the objects described.

What is claimed as the invention is:

1. In an electrical circuit including a single source of constant voltage D.C. excitation power and an A.C. load; an alternator having a D.C. field winding; an electrical excitation circuit including the constant voltage D.C. source of excitation power and alternator; a rectifier; and electrical connections connecting the rectifier in series with the A.C. load and in parallel with the constant voltage D.C. source of excitation power and with the alternator field.

2. In an electrical circuit including a single source of constant voltage D.C. excitation power and an A.C. load; an alternator having generating and exciting field windings in which the generator windings are such as to cause the flux density of the magnetic structure to operate within the saturation region at rated output voltage and frequency; an electrical excitation circuit including the constant voltage D.C. source of excitation power and alternator; a bridge type rectifier; and electrical connections connecting the bridge type rectifier in series with the A.C. load and in parallel with the constant voltage D.C. source of excitation power and with the alternator field.

3. In an electrical circuit including a single source of constant voltage D.C. excitation power and an A.C. load; an alternator having field windings; an electrical excitation circuit including the constant voltage D.C. source of excitation power, the alternator, and a blocking rectifier; a bridge type rectifier; and electrical connections connecting the bridge type rectifier in series with the A.C. load and in parallel with the alternator field and the constant voltage D.C. source of excitation power, said connections also connecting the blocking rectifier in series with the constant voltage D.C. source of excitation power.

4. In an electrical circuit including a single source of fixed D.C. excitation power and an A.C. load; an alternator having a D.C. field winding; an electrical excitation circuit including the fixed D.C. source of excitation power and alternator; a bridge type rectifier; and electrical connections connecting the bridge type rectifier in series with the A.C. load and in parallel with the fixed D.C. source of excitation power and with the alternator field, there also being included in the circuitry a blocking rectifier in series with the fixed D.C. source of excitation power, a fuse in series with the alternator field, and a voltage sensitive variable resistance shunted across the bridge type rectifier.

5. Electric circuitry for a piece of A.C. equipment electrically connected with a constant voltage D.C. single source of excitation power with an interposed alternator including a field winding and an interposed bridge type rectifier, means electrically connecting said rectifier in series with the A.C. equipment and in parallel with the constant voltage D.C. source of excitation power and the alternator field winding.

References Cited in the file of this patent

UNITED STATES PATENTS

| | | |
|---|---|---|
| 2,052,318 | Siegmund | Aug. 25, 1936 |
| 2,482,588 | Tourneau | Sept. 20, 1949 |
| 2,531,062 | Tourneau | Nov. 21, 1950 |
| 2,540,600 | Stalhane | Feb. 6, 1951 |
| 2,719,259 | Miner | Sept. 27, 1955 |
| 2,892,143 | Sommer | June 23, 1959 |

FOREIGN PATENTS

| | | |
|---|---|---|
| 1,050,847 | France | Sept. 9, 1953 |
| 678,248 | Germany | July 12, 1939 |